OPERATIONAL MAGNETIC AMPLIFIER

Filed May 1, 1962

United States Patent Office 3,225,291

Patented Dec. 21, 1965

3,225,291

OPERATIONAL MAGNETIC AMPLIFIER

Takeo Miura, Kitatama-gun, and Chikafusa Hirano, Tachikawa-shi, Tokyo-to, Japan, assignors to Kabushiki Kaisha Hitachi Seisakusho, Chiyoda-ku, Tokyo-to, Japan, a joint-stock company of Japan Filed May 1, 1962, Ser. No. 191,580
3 Claims. (Cl. 323—89)

This invention relates to operational amplifiers, and more particularly it relates to a new magnetic operational amplifier.

It is an object of the present invention to solve certain problems associated with conventional magnetic operational amplifiers as will be described in greater detail hereinafter.

It is another object of the invention to provide a new operational amplifier utilizing a magnetic amplifier and exhibiting, without using a high amplification factor, highly desirable characteristics which are equivalent to those obtainable in the case of an operational amplifier having an extremely high amplification factor.

The nature of the invention, its details, and the manner in which the foregoing objects as well as other objects and advantages as will presently become apparent will be fully understood by reference to the following description of a conventional operational amplifier, presented for comparison purpose, and an embodiment of the present invention when taken in conjunction with the accompanying drawing in which like parts are designated by like reference letters, and in which.

Figure 1:
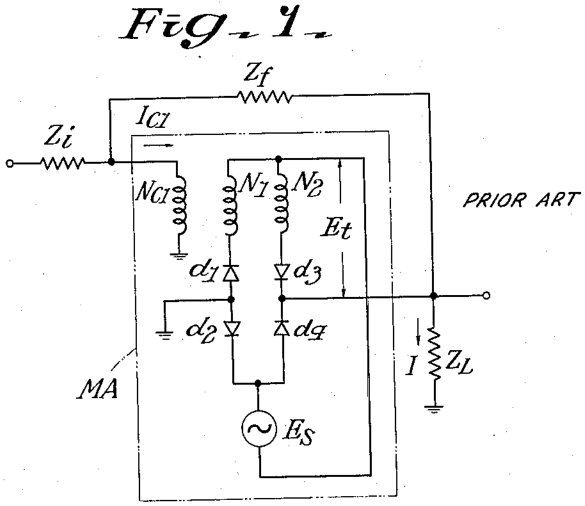
FIG. 1 is an electrical connection diagram representing a general example of a conventional operational circuit.

The connection diagram shown in FIG. 1 represents a conventional feedback operational circuit wherein a magnetic operational amplifier MA is used. This amplifier MA is composed of an alternating-current power source $E_s$, diodes $d_1$, $d_2$, $d_3$, and $d_4$ which form a full-wave rectifying circuit, output windings $N_1$ and $N_2$ which are wound on separate magnetic cores, and a control coil $N_{c1}$ which is wound commonly on the said magnetic cores. The feedback operational circuit is formed by connecting an input impedance $Z_1$ and a feedback impedance $Z_f$ to the aforementioned amplifier MA. Reference letter $Z_L$ represents the load of the said circuit.

In such a feedback operational circuit as described above, the input current $I_{c1}$ flowing through the control coil $N_{c1}$ of the operational amplifier MA may be represented by the following equation.

$$I_{c1}=\frac{\frac{E_i}{Z_i}+\frac{E_o}{Z_f}}{1+Z_1\left(\frac{1}{Z_i}+\frac{1}{Z_f}\right)} \quad (1)$$

where:

$Z_1$ is the impedance of the winding $N_{c1}$;
$E_i$ is the input voltage; and
$E_o$ is the output voltage.

If the amplification factor of the magnetic amplifier itself is denoted by $-R_A$, a voltage which is $-R_A$ times the input current $I_{c1}$ should, conceptionally, appear as the output voltage $E_o$. Actually, however, the output voltage $E_o$ is as follows:

$$E_o=E_s-E_t \quad (2)$$

where:

$E_t$ is the terminal voltage of the operational amplifier; and
$E_s$ is the voltage of the alternating-current power source.

Figure 2:
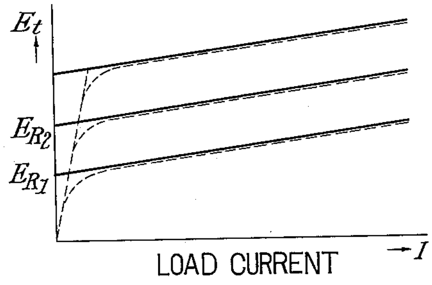
FIG. 2 is a graphical representation indicating characteristic curves of the circuit of FIG. 1.

The relation between the above said terminal voltage $E_t$ and the load current I, when graphically represented with the input current $I_{c1}$ as a parameter, produces such characteristic curves as are shown by dotted lines in FIG. 2. By considering these dotted line curves to be approximated by the full lines shown, and denoting their slope by $\Delta E_t/\Delta I=Z_0$, the following expression is obtained.

$$E_t=E_R+IZ_0 \quad (3)$$

In the above equation, the value of the voltage $E_R$ is determined by only the magnitude of the input current $I_{c1}$ and may be considered to be given by $$E_R=I_{c1}R_A$$

As a result, from the foregoing Equations 1, 2, and 3, the following expression for the output voltage $E_o$ can be derived.

$$E_0=E_s-IZ_0-I_{c1}R_A=E_s-\frac{Z_0}{Z_L}E_0-\frac{\frac{E_i}{Z_i}+\frac{Z_0}{Z_f}}{1+Z_1\left(\frac{1}{Z_i}+\frac{1}{Z_f}\right)}R_A=$$

$$-\frac{Z_f}{Z_i}\,\frac{E_i-\frac{Z_i\left(1+\frac{Z_1}{Z_i}+\frac{Z_1}{Z_f}\right)}{R_A}E_s}{1+\frac{Z_f\left(1+\frac{Z_1}{Z_i}+\frac{Z_1}{Z_f}\right)}{Z_LR_A}(Z_L+Z_0)} \quad (4)$$

In this case, since the power source voltage $E_s$ is a constant voltage, if it is caused to be cancelled by such a suitable means as a push-pull connection, the expression of the Equation 4 will become that of the following equation.

$$E_o=-\frac{Z_f}{Z_i}\,\frac{E_i}{1+\frac{Z_f\left(1+\frac{Z_1}{Z_i}+\frac{Z_1}{Z_f}\right)}{Z_LR_A}(Z_L+Z_0)} \quad (5)$$

The second term in the denominator of the righthand side of the above Equation 5, that is, $$\frac{Z_f\left(1+\frac{Z_1}{Z_i}+\frac{Z_1}{Z_f}\right)}{Z_LR_A}(Z_L+Z_0)$$

is an error term. If this term is made to be zero, the output voltage may be expressed by $$E_o=-\frac{Z_f}{Z_i}E_i \quad (6)$$

whereby an ideal feedback operational circuit can be obtained. For this purpose, the above-mentioned term can be made to approach zero by increasing to an extreme magnitude the amplification factor $R_A$ of the aforesaid operational amplifier. To increase $R_A$ to an extreme magnitude, however, is difficult.

The above problem has been solved by the present invention, in which a voltage compensating winding through which a feedback current which is proportional to the output voltage flows and a current compensating winding through which a feedback current which is proportional to the output current are separately wound, together with a control winding about the magnetic cores of a magnetic operational amplifier, whereby the afore-mentioned error term can be made to approach zero with ample proximity without increasing the amplification factor $R_A$ to a substantially large magnitude.

Figure 3:
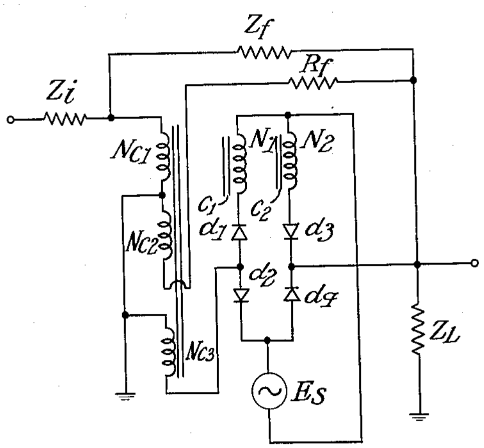
FIG. 3 is an electrical connection diagram representing an illustrative embodiment of the operational amplifier according to the present invention.

One illustrative embodiment of the operational amplifier according to the invention is shown in FIG. 3, wherein reference letter $R_f$ designates an output voltage feedback resistance connected in series to a voltage compensating winding $N_{c2}$, which, together with a current compensating winding $N_{c3}$, is wound on the magnetic cores $C_1$ and $C_2$ of a magnetic operational amplifier. The other parts of this embodiment are the same as those of the conventional amplifier shown in FIG. 1.

The ratio of winding turns of each of the compensating windings $N_{c2}$ and $N_{c3}$ to the winding turns of the control winding $N_{c1}$ may be denoted as follows:

$$\frac{N_{c2}}{N_{c1}}=\beta,\ \frac{N_{c3}}{N_{c1}}=\alpha \quad (7)$$

Then, the output voltage $E_o$ and the input current $I_{c1}$ may be expressed by the following equations.

$$\left.\begin{aligned} E_0&=-IZ_0-\left(I_{c1}-\beta\frac{E_0}{R_f}-\alpha I\right)R_A\\ I_{c1}&=\frac{\frac{E_i}{Z_i}+\frac{E_0}{Z_f}}{1+Z_i\left(\frac{1}{Z_i}+\frac{1}{Z_f}\right)}\end{aligned}\right\} \quad (8)$$

From Equations 8, the following expression for the output voltage $E_o$ is obtained.

$$E_o=-\frac{Z_f}{Z_i}\cdot\frac{E_i}{1-\frac{Z_f}{R_f}\left(1+\frac{Z_1}{Z_f}+\frac{Z_1}{Z_i}\right)\beta+\frac{Z_f\left(1+\frac{Z_1}{Z_i}+\frac{Z_1}{Z_f}\right)(Z_0+Z_L-\alpha R_A)}{Z_LR_A}} \quad (9)$$

In the above case, it will be assumed that $E_s$ has been cancelled out.

If now the turn ratio $\alpha$ is so selected as to satisfy the equation $Z_0=\alpha R_A$, the third term of the denominator of the righthand side of the Equation 9 will become $$\frac{Z_f}{R_A}\left(1+\frac{Z_1}{Z_i}+\frac{Z_1}{Z_f}\right)$$

and $E_o$ will become independent of $Z_L$. Then, if the turn ratio $\beta$ is so selected as to satisfy the relation $$\frac{1}{R_A}=\frac{\beta}{R_f}$$

the sum of the second and third term in the denominator will become zero, and the relation expressed in the Equation 6 is obtained.

That is, in the operational amplifier according to this invention, it is possible, by suitably selecting the number of turns of two specially provided, compensating windings, to obtain characteristics which are equivalent to those obtainable in the case wherein an operational amplifier having an extremely high amplification factor is used, even if the amplification factor of the operational amplifier of this invention is not very high.

The operational amplifier of this invention has the further advantage in that the circuit constant of each compensating winding can be determined irrespectively of the values of the load $Z_L$, the input impedance $Z_i$, and the feedback impedance $Z_f$.

Although this invention has been described with respect to a particular embodiment thereof, it is not to be so limited as changes and modifications may be made therein which are within the full intended scope of the invention, as defined by the appended claims.

What is claimed is:

1. A feedback type operational circuit utilizing a magnetic amplifier, which comprises, in combination, an amplifier having two magnetic cores and including an alternating current source; one output winding wound about each said core and connected in parallel to said current source and in series to two diodes which also are connected to said current source; and a control coil wound commonly about said cores; said current source, cores, diodes, output windings and control coil constituting a full-wave rectifying circuit; a voltage compensating winding and a current compensating winding, both wound about said magnetic cores; an output voltage feedback resistance connected in series to said compensating windings; said voltage compensating winding forming a positive feedback circuit by supplying a current proportionate to a voltage $E_o$; an input impedance $Z_i$ connected to a feedback impedance in said current and voltage compensating windings; an input voltage $E_i$ thus being conducted into said control coil; a feedback impedance $Z_f$ being connected to said output and said control winding thus conducting said output voltage $E_o$ thereto; whereby $$E_o=\frac{Z_f}{Z_i}\cdot E_i$$

2. A feedback operational circuit utilizing a magnetic amplifier, which comprises, in combination, an amplifier having two magnetic cores and including an alternating current source; one output winding wound about each said core and connected in parallel to said current source and in series to two diodes which also are connected to said current source; and a control coil wound commonly about said magnetic cores; said current source, cores, diodes, output windings and control coil constituting a full-wave rectifying circuit through whose output windings an output voltage $E_o$ passes, proportionate to the current passing through said control coil; a voltage compensating winding and a current compensating winding, both wound about said magnetic cores; an output voltage feedback resistance connected in series to said compensating windings; said voltage compensating winding supplying said output voltage $E_o$; an input impedance $Z_i$ connected to said current and voltage compensating windings, an input voltage $E_i$ thus being conducted into said control coil; a feedback impedance $Z_f$ being connected to said output and said control winding thus conducting said output voltage $E_o$ thereto; whereby $$E_o=\frac{Z_f}{Z_i}\cdot E_i$$

3. In a feedback type operational circuit utilizing a magnetic amplifier having magnetic cores; an alternating current source; two diodes connected to each said amplifier and to said current source; one output winding wound about each said core and connected in parallel to said current source and in series to said diodes; and a control coil wound commonly about said cores; said amplifier constituting a full-wave amplifying circuit; the improvements which comprise, in combination, a voltage compensating winding and a current compensating winding, both wound about said magnetic cores; an output voltage feedback resistance connected in series to said compensating windings; said voltage compensating winding forming a positive feedback circuit by supplying a current proportionate to a voltage $E_o$; an input impedance $Z_i$ connected to said feedback and to said current and voltage compensating windings; an input voltage $E_i$ thus being conducted into said control coil; a feedback impedance $Z_f$ being connected to said control winding thus conducting said output voltage $E_o$ thereto; whereby $$E_o=\frac{Z_f}{Z_i}\cdot E_i$$

References Cited by the Examiner

UNITED STATES PATENTS

| | | | |
|---|---|---|---|
| 2,581,953 | 1/1952 | Hecht et al. | 330—102 X |
| 2,730,574 | 1/1956 | Belsey | 323—89 |
| 2,810,519 | 10/1957 | Creusere | 235—178 |
| 2,843,671 | 7/1958 | Wilkins | 330—102 X |

LLOYD McCOLLUM, *Primary Examiner.*